United States Patent
Cook et al.

(10) Patent No.: US 8,116,358 B2
(45) Date of Patent: *Feb. 14, 2012

(54) SINGLE OSCILLATOR TRANSCEIVER

(75) Inventors: Dean Lawrence Cook, Mesa, AZ (US); Kenneth V. Buer, Gilbert, AZ (US)

(73) Assignee: ViaSat, Inc., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/614,288

(22) Filed: Nov. 6, 2009

(65) Prior Publication Data

US 2010/0112961 A1 May 6, 2010

Related U.S. Application Data

(63) Continuation-in-part of application No. 11/465,760, filed on Aug. 18, 2006, which is a continuation of application No. 10/233,886, filed on Sep. 3, 2002, now Pat. No. 7,116,706, which is a continuation-in-part of application No. 10/059,465, filed on Jan. 28, 2002, now Pat. No. 6,996,165.

(60) Provisional application No. 60/264,384, filed on Jan. 26, 2001.

(51) Int. Cl.
*H04L 5/16* (2006.01)
*H04B 1/38* (2006.01)

(52) U.S. Cl. ............ 375/219; 375/306; 455/76; 455/86; 455/318; 331/18

(58) Field of Classification Search .................. 375/316, 375/306, 219, 295; 455/73, 76, 318, 66; 331/18

See application file for complete search history.

(56) References Cited

U.S. PATENT DOCUMENTS

| | | | |
|---|---|---|---|
| 5,239,685 A | 8/1993 | Moe et al. | |
| 5,307,029 A | 4/1994 | Schenk | |
| 5,666,355 A | 9/1997 | Huah et al. | |
| 5,734,970 A | 3/1998 | Saito | |
| 5,890,051 A | 3/1999 | Schlang et al. | |

(Continued)

FOREIGN PATENT DOCUMENTS

KR 10-2004-0063871 A 7/2004

(Continued)

OTHER PUBLICATIONS

Tino Copani, Santo A. Smerzi, Giovanni Girlando and Giuseppe Palmisano; A 12-GHz Silocon Bipolar Dual-Conversion Receiver for Digital Satellite Applications; IEEE Journal of Solid-State Circuits, vol. 40, No. 6, Jun. 2005; pp. 1278-1287.

(Continued)

*Primary Examiner* — Ted Wang
(74) *Attorney, Agent, or Firm* — Snell & Wilmer L.L.P.

(57) ABSTRACT

A frequency plan is provided for particular use in a transceiver. Advantageously, a single oscillator may be used to generate desired frequency signals. One or more power splitters receive the signal and equally divide the signal into first and second signals having a frequency substantially equal to the original. Multipliers on each arm of the transceiver receive a signal and increase the frequency of the signal. In one exemplary embodiment, multiple signals having different frequencies may be transmitted over the same cable due in part to the generated frequency separation between the signals. In another exemplary embodiment, multiple signals may be transmitted over multiple cables. In another exemplary embodiment, the frequency plan may self correct a transmit signal based on a reference signal, such as the receive signal. Additionally, multiple signals over one or more cables may be transmitted at or below 3 GHz.

25 Claims, 11 Drawing Sheets

U.S. PATENT DOCUMENTS

| | | | |
|---|---|---|---|
| 5,937,335 | A | 8/1999 | Park et al. |
| 5,995,812 | A | 11/1999 | Soleimani et al. |
| 6,115,584 | A | 9/2000 | Tait et al. |
| 6,452,909 | B1 | 9/2002 | Bauer |
| 7,116,706 | B2 | 10/2006 | Cook et al. |
| 2003/0027530 | A1 | 2/2003 | Levitt et al. |
| 2004/0048588 | A1 | 3/2004 | Ammar et al. |

FOREIGN PATENT DOCUMENTS

| | | |
|---|---|---|
| KR | 10-2004-0102017 A | 12/2004 |
| KR | 10-0667040 B1 | 1/2007 |
| WO | 2004/023675 | 3/2004 |

OTHER PUBLICATIONS

USPTO; Office Action for U.S. Appl. No. 10/059,465 dated Apr. 21, 2005.
USPTO; Notice of Allowance for U.S. Appl. No. 10/059,465 dated Oct. 19, 2005.
USPTO; Office Action for U.S. Appl. No. 10/233,886 dated Apr. 21, 2005.
USPTO; Office Action for U.S. Appl. No. 10/233,886 dated Oct. 18, 2005.
USPTO; Notice of Allowance for U.S. Appl. No. 10/233,886 dated Apr. 13, 2006.
USPTO; Office Action for U.S. Appl. No. 11/275,932 dated Apr. 25, 2006.
USPTO; Office Action for U.S. Appl. No. 11/275,932 dated Nov. 28, 2006.
USPTO; Notice of Allowance for U.S. Appl. No. 11/275,932 dated May 18, 2007.
USPTO; Office Action for U.S. Appl. No. 11/465,760 dated Oct. 3, 2007.
USPTO; Office Action for U.S. Appl. No. 11/465,760 dated Apr. 21, 2008.
USPTO; Office Action Restriction for U.S. Appl. No. 11/465,760 dated Dec. 4, 2008.
USPTO; Final Office Action for U.S. Appl. No. 11/465,760 dated Mar. 6, 2009.
USPTO; Office Action for U.S. Appl. No. 11/465,760 dated Dec. 11, 2009.
International Search Authority, International Search Report and Written Opinion, Jun. 16, 2010, 9 pgs.
Jian Zhang et al Single Local-Oscillator Solution for Multiband OFDM Systems Communications, 2007.ICC'07.IEEE International Conference, Glasgow IEEE, Jun. 24-28, 2007, pp. 4116-4121.
USPTO; Notice of Allowance for U.S. Appl. No. 11/465,760 dated Aug. 8, 2010.
Office Action, U.S. Appl. No. 12/961,211, dated Jun. 24, 2011.
International Preliminary Report on Patentability dated May 19, 2011 in International Application No. PCT/US2009/063645.
USPTO; Notice of Allowance for U.S. Appl. No. 12/961,211 dated Dec. 12, 2011.

US 8,116,358 B2

SINGLE OSCILLATOR TRANSCEIVER

CROSS-REFERENCE TO RELATED APPLICATIONS

This application is a continuation-in-part of U.S. patent application Ser. No. 11/465,760, filed on Aug. 18, 2006, and entitled "SINGLE OSCILLATOR TRANSCEIVER", which is a continuation of U.S. patent application Ser. No. 10/233,886, now issued U.S. Pat. No. 7,116,706, filed on Sep. 3, 2002, and entitled "SINGLE OSCILLATOR TRANSCEIVER FREQUENCY PLAN", which application is a continuation-in-part of Ser. No. 10/059,465, now issued U.S. Pat. No. 6,996,165, filed on Jan. 28, 2002, under the same title, which claims priority from U.S. Provisional Patent Application Ser. No. 60/264,384, filed Jan. 26, 2001, under the same title.

FIELD OF INVENTION

The present invention relates, generally, to a system and method for a frequency plan, and in particular to a single oscillator frequency plan, and more particularly to a system and method for a single oscillator frequency plan configured to operate at intermediate frequencies (IF) below 3 GHz.

BACKGROUND OF THE INVENTION

In general, conventional transceiver frequency plans include two separate LOs (local oscillators) to drive mixers in the system and enable a wider range of frequency use. Multiple oscillators, however, are problematic. For example, oscillators have a tendency to drift (shift from the desired frequency range). A system containing two or more oscillators will experience a drift in each oscillator at a different rate unless it is phase locked to a reference frequency. Thus, the exact transmit frequency of the system can unknowingly vary, resulting in a need for constant sampling of the transmit local oscillator. Moreover, as is common with most electrical equipment, increasing the number of elements or components increases hardware costs and consumes valuable PWB (printed wire board) space.

Accordingly, an improved system and method for a frequency plan in a transceiver system is needed. Specifically, a system and method for a single oscillator transceiver frequency plan. In addition, a transceiver frequency plan operable at lower frequencies is needed, especially for Ku transmit and receive bands.

SUMMARY

In various exemplary embodiments, a transceiver comprises a transmit portion configured to transmit a radio frequency ("RF") transmit signal and a receive portion configured to receive a RF receive signal. The transceiver may comprise a power splitter configured to receive an oscillator signal and to divide the oscillator signal into first and second signals; and a first multiplier configured to receive the first signal and to scale the frequency of the first signal to create a first scaled signal, wherein the frequencies of the first scaled signal and the second signal are not equal to each other, wherein the first scaled signal is used for frequency conversion in the transmit portion of the transceiver, and wherein the second signal is used for frequency conversion in the receive portion of the transceiver.

In another exemplary embodiment, a transceiver comprises a transmit portion and a receive portion. The transceiver may comprise a power splitter configured to receive an oscillator signal and to divide the oscillator signal into first and second signals; and a first multiplier configured to receive the first signal and to scale the frequency of the first signal to create a first scaled signal, wherein the frequencies of the first scaled signal and the second signal are not equal to each other, wherein the first scaled signal is used for frequency conversion in the transmit portion of the transceiver, and wherein the second signal is used for frequency conversion in the receive portion of the transceiver.

In various exemplary embodiments, the transmit portion further comprises a dual super-heterodyne configuration. In various exemplary embodiments, a transmit IF signal is frequency corrected to compensate for drift in the oscillator signal, and the frequency correction occurs before the frequency conversion in the transmit portion. In various other exemplary embodiments, a frequency correction device is configured to: identify frequency drift in an IF receive signal in a receive portion; and pre-correct an IF transmit signal such that an RF transmit signal output of the transceiver is frequency corrected to account for drift in the oscillator signal.

BRIEF DESCRIPTION OF THE DRAWINGS

These and other features, aspects and advantages of the present invention will become better understood with reference to the following description, appending claims, and accompanying drawings where:

DETAILED DESCRIPTION

The subject matter of the invention is particularly suited for use in connection with complex mechanical and electrical systems, such as satellite communication systems. As a result, the preferred exemplary embodiment of the present invention is described in that context. It should be recognized, however, that such description is not intended as a limitation on the use or applicability of the present invention, but is instead provided merely to enable a full and complete description of a preferred embodiment.

An improved transceiver frequency plan system according to various aspects of the invention is disclosed. Generally, a frequency plan system of the exemplary embodiments provides a system and method of converting incoming receive signals from RF (radio frequency) frequency bands to receive IF (intermediate frequency) frequency bands, while simultaneously, or near simultaneously, converting transmit signals from IF frequency bands to transmit RF frequency bands using a single free-running local oscillator. In addition, a frequency plan system according to various embodiments may be configured to operate at desired frequencies, such as frequencies in the range where commonly available modem components are available.

In one particular embodiment, a frequency plan system of the invention, having a single local oscillator for both the transmit and receive arms, mixes an IF signal to a lower frequency range and separates the IF into, for example, two signals that are distant enough from each other so that both signals may be transmitted on the same cable without signal interference from each other.

In another particular embodiment, a frequency plan system of the invention, having a single local oscillator for both the transmit and receive arms, mixes an IF signal by using high side and/or low side injection, and transmits two separate signals on two cables.

Figure 1:
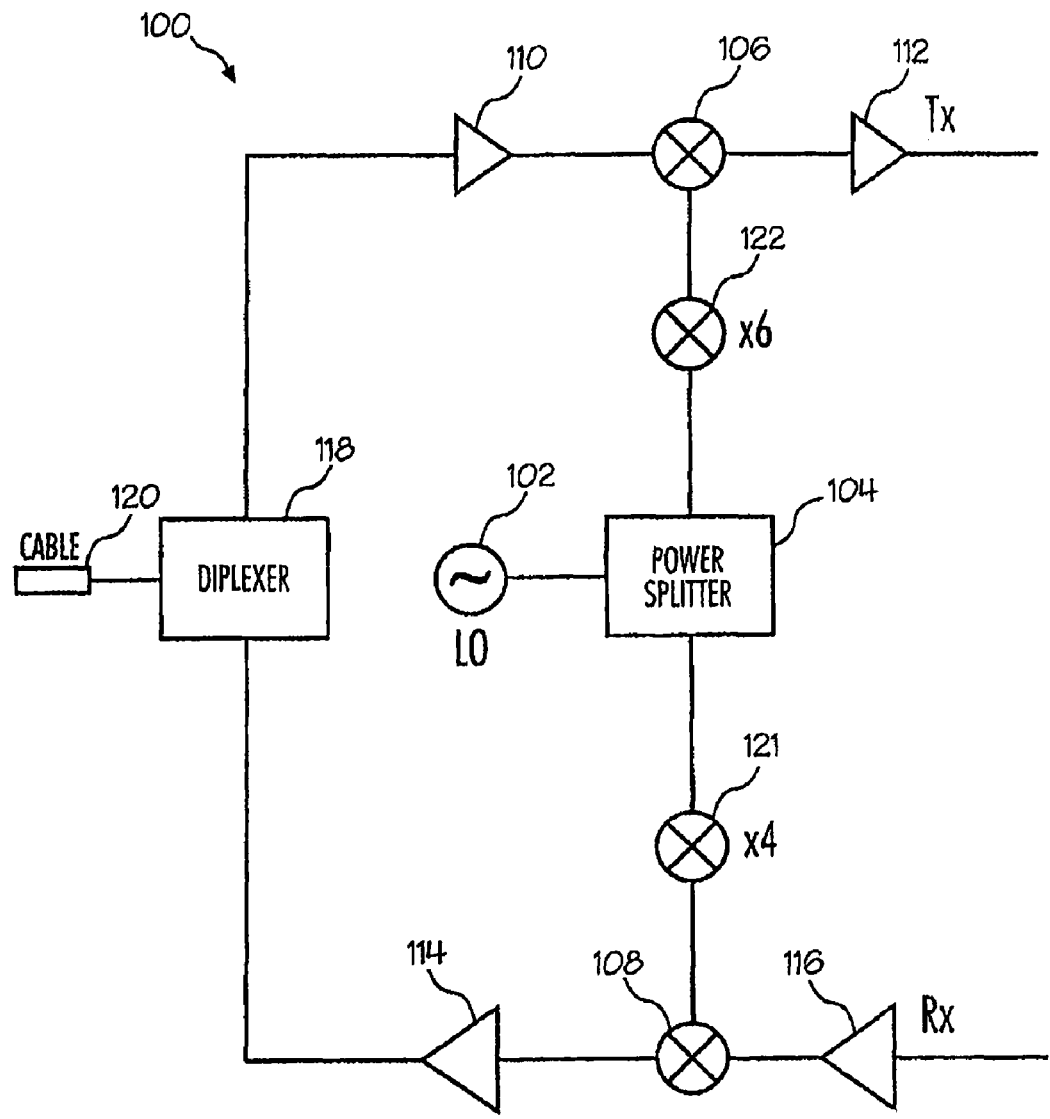
FIGS. 1, 2 and 5 illustrate, in block format, transceiver systems implementing exemplary frequency plans in accordance with the invention.

FIG. 1 illustrates, in block format, a transceiver system 100 according to one embodiment of the invention. System 100 implements a frequency plan in accordance with the invention which generally includes a local oscillator (LO) 102, a power splitter 104, a plurality of mixers 106, 108, a plurality of mulitpliers 121 and 122, a plurality of amplifiers 110-116, a diplexer 118, and a cable 120. The local oscillator 102 may comprise any suitable oscillator configured to generate a range of desired frequencies. For example, VCOs (voltage controlled oscillators) and DROs (dielectric resonator oscillators) are available for generating frequencies in a variety of desired ranges (e.g., up to about 14 GHz).

Power splitter 104 may comprise any suitable component or combination of components configured to divide a power signal into two or more signals. Additionally, the divided signals have a frequency equal to, or substantially equal to, the frequency of the original signal.

Mixers 106, 108 and multipliers 121, 122 are each represented in FIG. 1 as a single element, however, it should be appreciated that each element merely demonstrates the function and is not intended to limit the scope to a single element. In fact, the multipliers may comprise several elements and/or stages of multiplication. Frequency multipliers (doublers) and their intended functions are well known in the industry and will not be discussed in detail.

In general, transmit mixer 106 receives an IF signal from diplexer 118 and an LO signal from LO 102. Mixer 106 mixes the signals and produces a RF signal that is either the sum or the difference of the IF and LO frequency signals. In a similar manner, receive mixer 108 combines a received RF signal with a received LO signal to produce an IF frequency signal.

One advantage of this particular embodiment is the ability to transmit multiple IF signals, having different frequencies, onto a single cable without risking interference among the signals. The unique frequency plan of the invention helps to enable this to occur by providing sufficient separation in frequency between the multiple IF signals to avoid interference. In various embodiments of the invention, a two-thirds (⅔) relationship between the IF signal frequencies is established. For example, one signal is multiplied to be four times the original LO frequency and a second signal is multiplied to be six times the LO frequency, thus a four-to-six, or two-thirds relationship between the signal frequencies.

In one particular embodiment of FIG. 1, multipliers 121 and 122 are configured to provide a two-thirds relationship between the frequencies of their respective signal outputs. Recall that power splitter 104 divides the original LO signal into substantially equal signals. In the present embodiment, power splitter 104 divides the received LO signal into two signals with each signal having substantially the same frequency as the original LO signal. One signal is received at multiplier 121 and the second signal is received at multiplier 122. In this particular exemplary embodiment, multiplier 122 may be configured to multiply the received signal by six and multiplier 121 may be configured to multiply the received signal by four. Therefore, a four-to-six or two-thirds relationship between the divided signals is established.

Amplifiers 110-116 may comprise any known or discovered amplification device(s) or element(s). Amplifiers 110 and 112 may include the "transmitting arm" of the system and amplifiers 114 and 116 may suitably include the "receiving arm" of the system. Typically there is some loss associated with transceiving systems of the type depicted in FIG. 1 and of particular use for the present invention. Signal loss may be due to line loss, interference, signal splitting and combining, and various other causes well known in the communications industry. Amplifiers 110-116 are suitably configured to account for any signal loss and amplify the signals accordingly.

In general, diplexer 118 enables the transmit and receive signals to be combined on the same cable. As previously stated, the frequency plan of this particular embodiment permits multiple signals of different frequency bands to be combined without causing interference among the separate signals. Diplexer 118 and its combining function are known in the industry and may be implemented as, for example, a pair of filters or a power divider that feeds separate filters.

Cable 120 comprises any suitable cable used for signal transmission. For example, a standard F connector with RG6 cable is well suited for this application. While various types of cables may be used, in general, low cost, readily available cable is often desirable. Currently, cables for signal transmission below 3 GHz are readily obtainable for low cost use such as home satellite communication applications. In this manner, another advantage of this particular embodiment relates to the ability to transmit multiple signals over a single cable with each signal transmitting at or below the desired 3 GHz.

In one particular application, transceiver system 100 is implemented in a ground satellite communication system comprising an outdoor unit and an indoor unit. In this application, cable 120 may extend from system 100, the outdoor unit, to an indoor unit having a detector and other various components.

Figure 2:
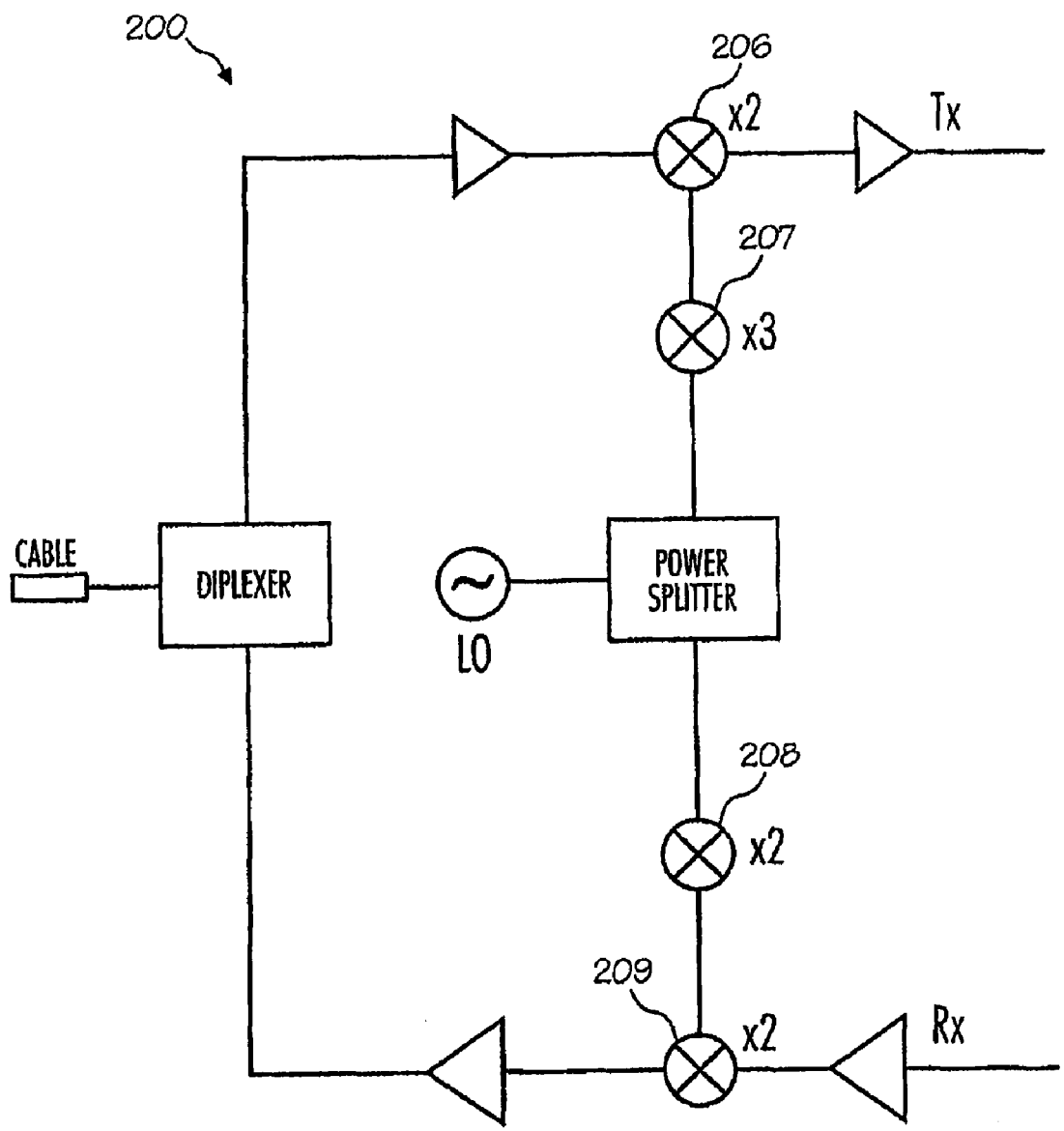

Referring now to FIG. 2, a transceiver system 200 in accordance with another embodiment of the invention is illustrated. System 200 includes substantially the same elements as system 100 of FIG. 1, except multipliers 121 and 122 of FIG. 1 are now depicted as multipliers 208 and 207 respectively, and mixers 106 and 108 are depicted as subharmonic mixers 206 and 209 respectively. As previously mentioned, the multipliers as described and illustrated herein, may comprise one or more elements or devices configured to multiply the received signal. For example, in this particular embodiment, multiplier 207 is suitably configured to multiply the received LO signal by three and subharmonic mixer 206 is suitably configured to further multiply the signal by two. Thus, the divided signal from the original LO signal is now multiplied by six. In a similar manner, multiplier 208 is suitably configured to multiply the original LO signal by two and subharmonic mixer 209 is suitably configured to further multiply the signal by two. Thus, the second divided signal from the original LO signal is multiplied by four. Thereby, establishing a two-thirds relationship between the two divided signals.

Figure 3:
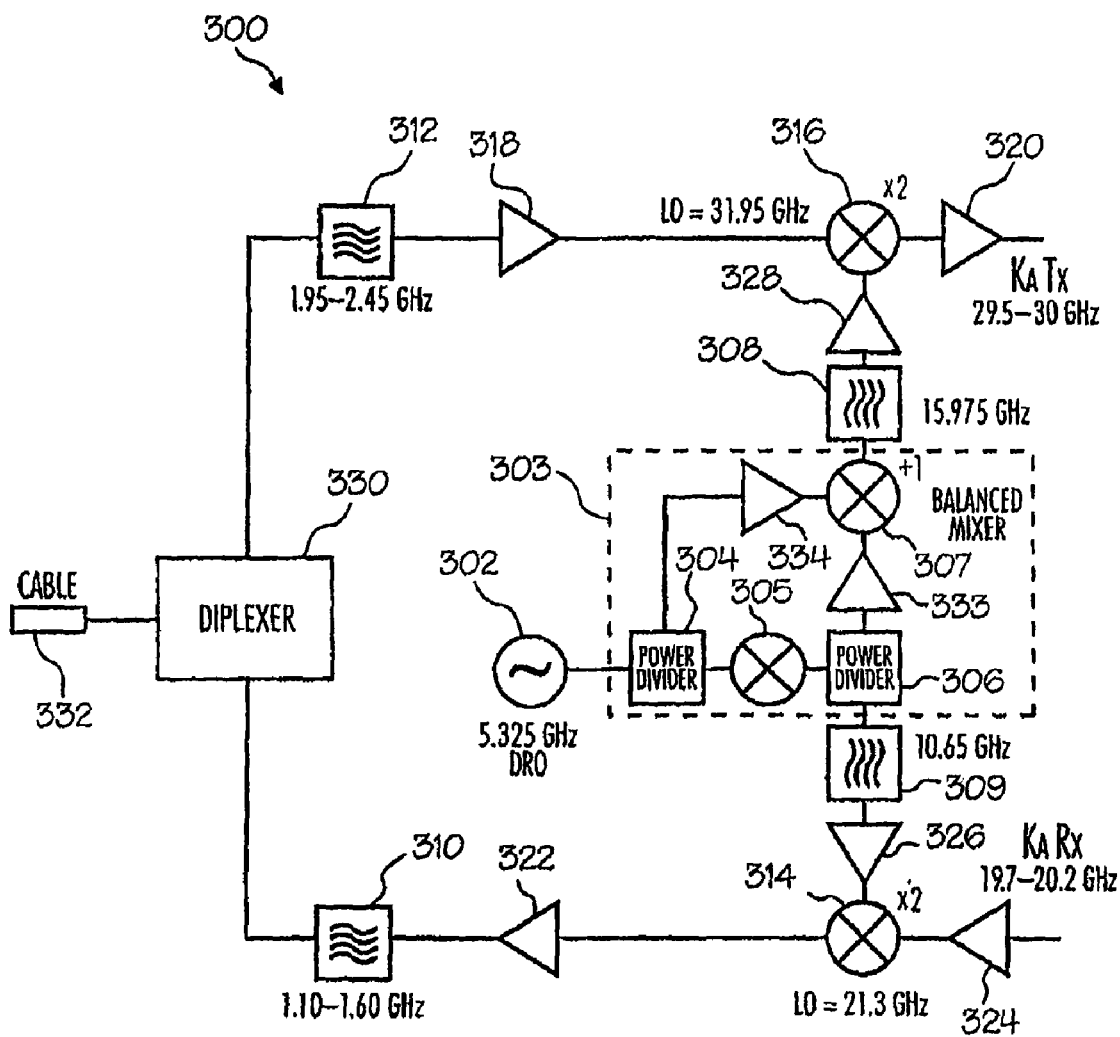
FIG. 3 illustrates, in block format, a transceiver system implementing an exemplary high side LO frequency plan in accordance with an embodiment of the invention.

FIG. 3 illustrates a transceiver system 300 in accordance with another embodiment of the invention. System 300 implements a transceiver frequency plan in accordance with the invention and, in this particular embodiment, a "high side" frequency plan is illustrated. In general, a high side frequency plan receives and transmits an RF signal which is lower in frequency than the multiplied LO signal frequency. Conversely, a low side frequency plan receives and transmits an RF signal which is higher in frequency than the multiplied LO signal frequency. As will be discussed in further detail, both high and low side frequency plans may be used with the various transceiver frequency plans of the invention.

In this embodiment, system 300 is suitably configured to operate in the Ka band frequency range. To better understand the specific embodiment, a range of frequencies is provided. It should be noted that this description and range of frequencies is in no way intended to be limiting on the disclosure or applicability of the invention. Rather, the illustration and accompanying description are provided merely to assist in understanding the invention. As should be realized, numerous combinations of elements and/or desired frequency ranges may be used in a frequency plan of the invention without departing from the overall spirit of the invention.

System 300 includes substantially the same elements as exemplary systems 100 and 200, such as a local oscillator (LO) 302, a power splitter and multiplier 303, a plurality of filters 308-312, multipliers 314 and 316, a plurality of amplifiers 318-328, a diplexer 330, and a cable 332. Unlike the previous examples, system 300 and the embodied exemplary frequency plan is shown and described with specific frequency ranges. The receiving arm of the system may receive an RF signal in the frequency range of about 19 to 20 GHz and the transmitting arm of the system may transmit at a frequency range from about 29 to 30 GHz. These transmit and receive bands are of particular interest for some applications because they coincide with the FCC assigned Internet access bands.

In one particular embodiment, LO 302 may comprise a dielectric resonator oscillator (DRO) which is known in the industry. In the present exemplary embodiment, LO 302 may include a 5.325 GHz DRO which, as will be described below, is one example of an LO which enables the diplexed IF signals to be transmitted over cable 332 at a frequency less than 3 GHz. While 5.325 GHz is conveniently described herein, this embodiment is not intended to be limiting and, in fact, other LOs may be equally suited for the invention, e.g., 10 GHz LO.

Power splitter and multiplier 303 may be referenced as the "first stage" of power splitting and multiplying. In this embodiment, power splitter and multiplier 303 includes power dividers 304 and 306, multipliers 305 and 307, and amplifiers 333 and 334. Power dividers 304 and 306 are similar in function as previously described power splitter 104, and may comprise any suitable component or combination of components configured to divide a power signal into two or more signals having a power level equal to the original signal. Power divider 304 receives the LO signal (in this embodiment is a 5.325 GHz signal) and divides the signal into two substantially equal signals of 5.325 GHz each. One signal is received at multiplier 305 and the second signal is received at multiplier 307. In one particular embodiment, multiplier 305 multiplies the received signal by two, i.e., from 5.325 to 10.65 GHz. The multiplied signal is then divided by power divider 306 into two substantially equal (10.65 GHz) signals. One of the 10.65 GHz signals is received at mixer 307, which is preferably a balanced mixer, and the other 10.65 GHz signal is filtered. Mixer 307 adds the 10.65 GHz signal with a second 5.325 GHz signal received from power divider 304. Thus, power splitter and multiplier 303 receives a single LO signal and outputs two LO signals; one signal equal to two times the original LO signal (multiplied by two at multiplier 305) and one signal equal to three times the original signal (multiplied by two at multiplier 305 and mixed with a signal equal to the original signal at mixer 307). In this particular example, one signal is multiplied from 5.325 GHz to 10.65 GHz (two times) and the second signal is multiplied from 5.325 GHz to 15.975 GHz (three times). As mentioned earlier, it is common to experience some signal loss during power splitting and combining, therefore, amplifiers 333 and 334 are included to amplify the signal accordingly.

Filters 308 and 309 comprise any suitable bandpass filter. In general, filters are included to exclude spurious signals which commonly occur after mixing, splitting and/or dividing signals. Filters 308 and 309 suitably filter out spurs from the signals output from power splitter and mixer 303. The output of filter 308 (~15.975 GHz or three times the LO signal frequency) and the output of filter 309 (~10.65 GHz or two times the LO signal frequency) may be amplified by amplifiers 328 and 326 respectively to account for any power loss.

Multiplier 314 receives a signal that is substantially two times greater in frequency than the original LO signal. In this embodiment, multiplier 314 is a doubler and thus the resulting signal is now four times greater than the original LO signal, i.e., ~21.3 GHz.

In a similar manner, multiplier 316 receives a signal that is substantially three times greater in frequency than the original LO signal. In this embodiment, multiplier 316 is a doubler and thus the resulting signal is now six times greater than the original LO signal, i.e., ~31.95 GHz. In one particular embodiment, the multipliers, such as multipliers 314 and 316, are subharmonic balanced mixers which provide LO rejection.

Multipliers 314 and 316 are additionally configured to present a roughly two-thirds (⅔) relationship between the two resulting signals. For example, in the present embodiment, the arm of the system containing multiplier 314 is configured to result in a signal that is four times the original LO signal and the other arm containing multiplier 316 is configured to result in a signal that is six times the original LO signal. Thus, a two-thirds (4/6) relationship exists between the two signals.

Filters 310 and 312 are configured to allow those signals to pass which represent the difference between the divided and multiplied LO signal and the transmitted RF signal. In this embodiment, the resulting signal from filter 312 is between 1.95 and 2.45 GHz (31.95 GHz-30 GHz; 31.95 GHz-29.5 GHz) and the resulting signal from filter 310 is between 1.1 and 1.6 GHz (21.3 GHz-20.2 GHz; 21.3 GHz-19.7 GHz). In this embodiment, the differences result in a signal frequency less than 3 GHz. This is a preferred situation due to the cable and industry standards. For example, in general, cables for transmitting signals in the frequency ranges of less than 3 GHz are currently less expensive, experience less loss and are readily available for a wide variety of uses, e.g., home communications.

Diplexer 330 and its function may be similar to diplexer 118 described herein.

Cable 332 comprises any suitable cable used for signal transmission and may be of the same type as described herein for cable 120.

Figure 4:
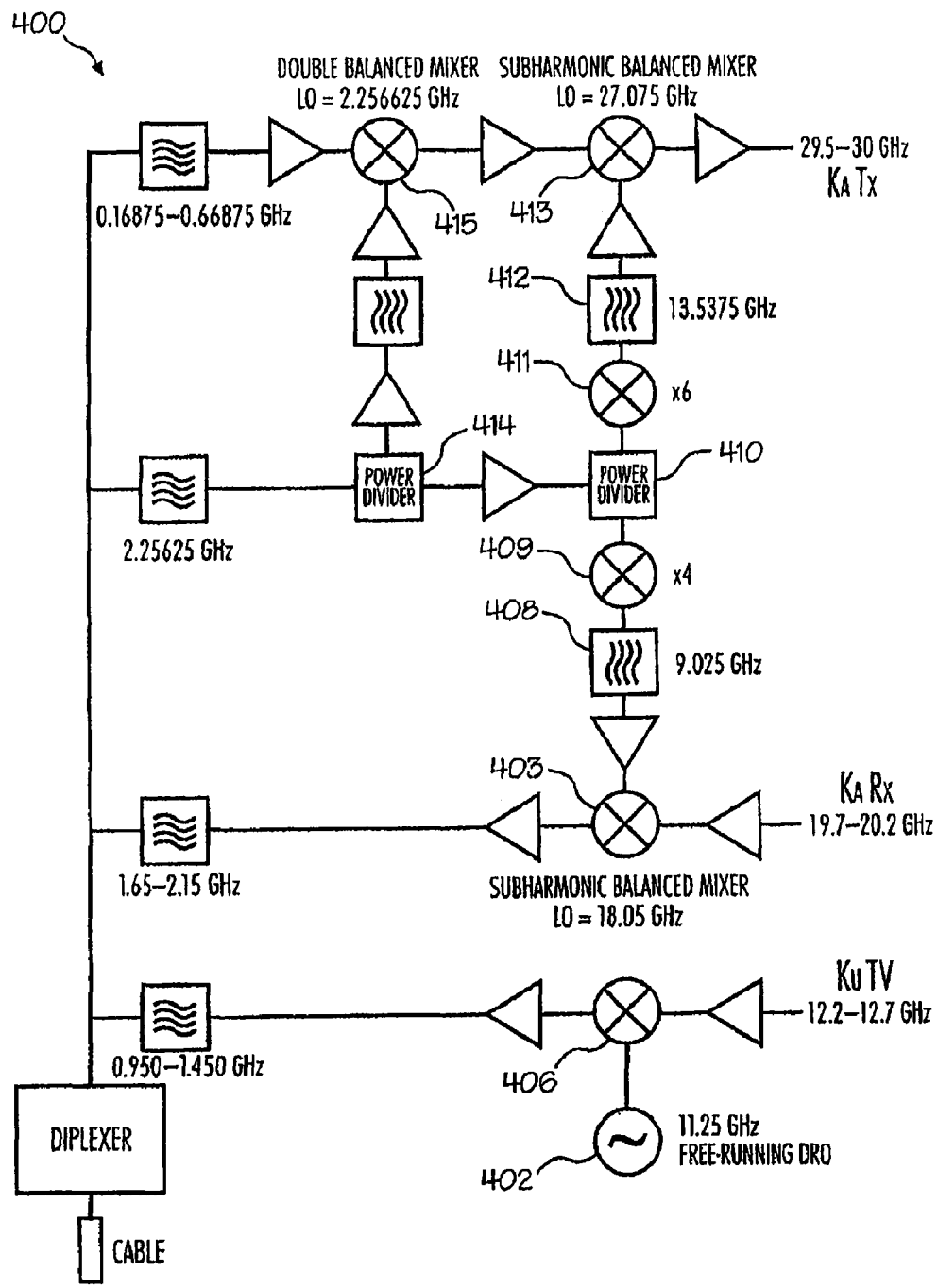
FIGS. 4 and 8 illustrate, in block format, a transceiver system implementing an exemplary low side LO frequency plan in accordance with an embodiment of the invention.

Referring now to FIG. 4, a transceiver system 400 in accordance with another embodiment of the invention is illustrated. System 400 implements a transceiver frequency plan in accordance with the invention and, in this particular embodiment, a "low side" frequency plan is illustrated. The individual components of system 400 are similar in nature to those of system 300 implementing a high side frequency plan and thus will not be described again in detail. System 400, by industry definition, is a low side plan because the multiplied LO signal is less than the RF signal. It should be noted that each of the resulting signals received at the diplexer are less than 3 GHz.

Similar to the previous examples, system 400 includes an LO 402, a plurality of multipliers 403, 406, 409, 411, 413 and 415, power dividers 410 and 414, filters 408 and 412, and a plurality of amplifiers (not numerical referenced). Additionally, system 400 is operating in the K, Ku and Ka bands frequency range, and in fact receives signals from multiple bands. In this particular illustration, one signal is received in the Internet access band and a second signal is received in the home satellite access band, e.g., dish network and direct TV. This example demonstrates the flexibility provided by a frequency plan of the invention. For instance, a dual up-convert with "tack-on" capabilities.

Again, it should be appreciated that system 400 is shown with exemplary frequency ranges for illustrative purposes only. The ranges provided are not intended to limit the scope of the invention, but merely to provide a numeric understanding of one particular frequency plan of the invention.

To fully understand the exemplary frequency plan of system 400, a brief explanation of the illustrative frequencies will follow. Mixer 406 may be implemented to produce an IF frequency signal that is the difference of the LO signal received from LO 402 and the received RF frequency signal. In this particular example, LO 402 may include a 11.25 GHz free-running DRO and the received RF signal may be in the KuTV band. Thus, the resulting IF signal falls within the desired frequency range of below 3 GHz.

As previously mentioned, the invention has a particular usefulness in connection with communication systems. Currently, communication frequency bands for home, business and personal use are assigned in the K, Ku and Ka band ranges by the FCC (e.g., Internet access, personal and home satellite). The previous transceiver systems illustrated exemplary frequency plans having a single oscillator and a single transmission cable. In general, the transmit and receive frequencies of the previous examples are in the Ka bands. These systems operate well for desired transmit and receive frequencies that are within a narrow band, for example no more than a 500 MHz frequency bandwidth. In the following embodiments, the transmit and receive frequencies are in the Ku band, which is often too wide to multiplex the two frequency arms onto a single cable. This is due in part to the operational frequency limits (e.g., between 0.950-2.150 GHz) currently placed on standard modems, for example at the receiving end of the cable. It should be appreciated that as frequency limits and standards change, single cables may be available for use in the Ku band in accordance with the principles of the invention.

Figure 5:
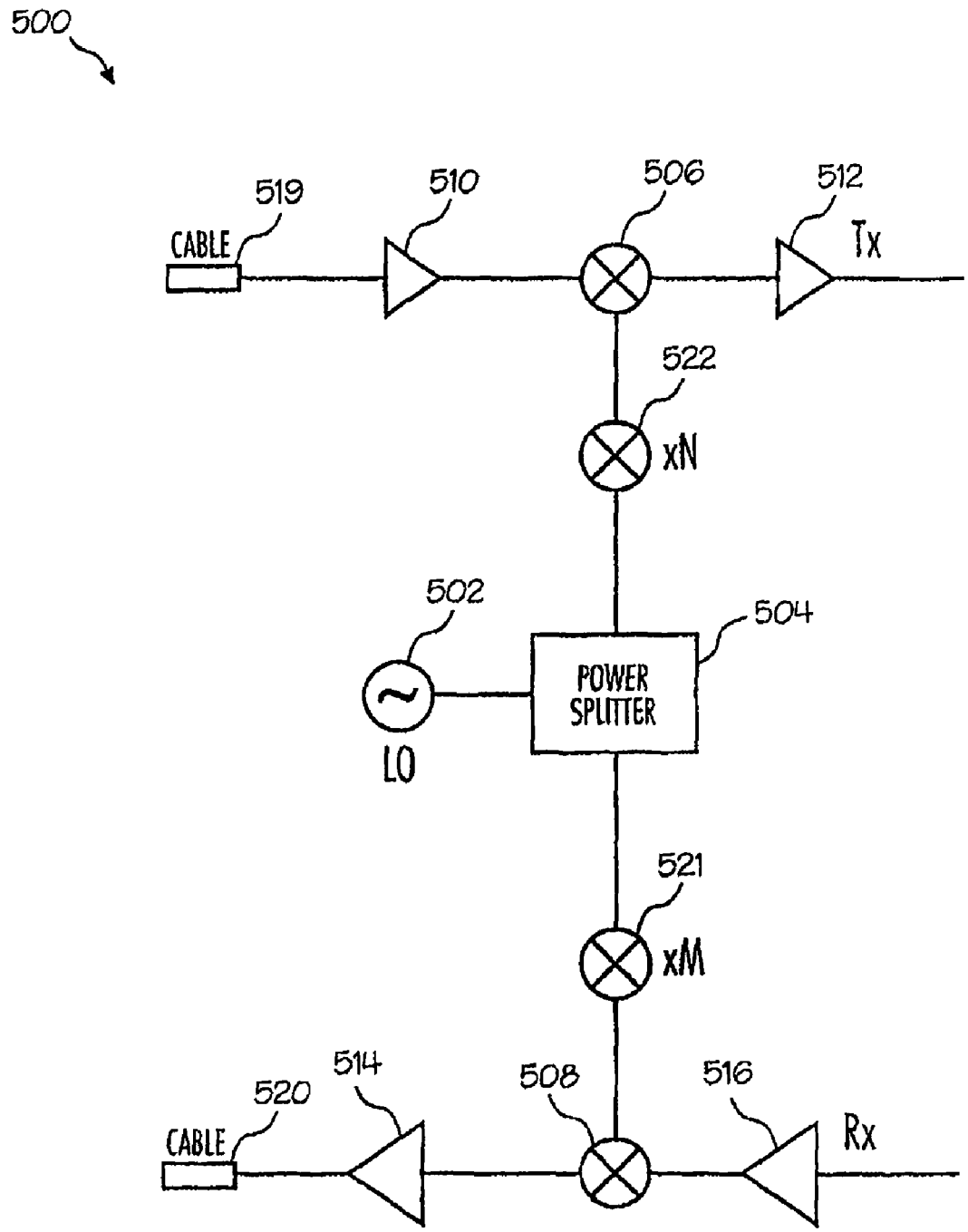

FIG. 5 illustrates, in block format, a transceiver system 500 according to another embodiment of the invention. Specifically, system 500 is suitably configured to operate in the Ku band frequency range. System 500 implements a frequency plan in accordance with the invention which generally includes a single LO 502, a power splitter 504, a plurality of mixers 506 and 508, a plurality of multipliers 521 and 522, a plurality of amplifiers 510-516, and cables 519 and 520. The elements of system 500 are similar to those previously described for system 100 and therefore will not be detailed again.

In this particular embodiment, multiple cables 519 and 520 are used for transmission of the transmit and receive IF frequency signals, respectively. In some applications, the frequency ranges may be too wide to transmit multiple frequencies over a single cable and thus, the multiple cable embodiment may be used. Accordingly, a diplexer, e.g., diplexer 118, is not needed to combine signals onto a single cable and therefore can be omitted from this embodiment.

In addition, multipliers 521 and 522 are configured to provide a "M-N" relationship between the frequencies of their respective signal outputs, where "M" and "N" may include any rational number. As will be discussed in the following examples, system 500 can suitably include a high side frequency plan, low side frequency plan or a combination of both.

Figure 6:
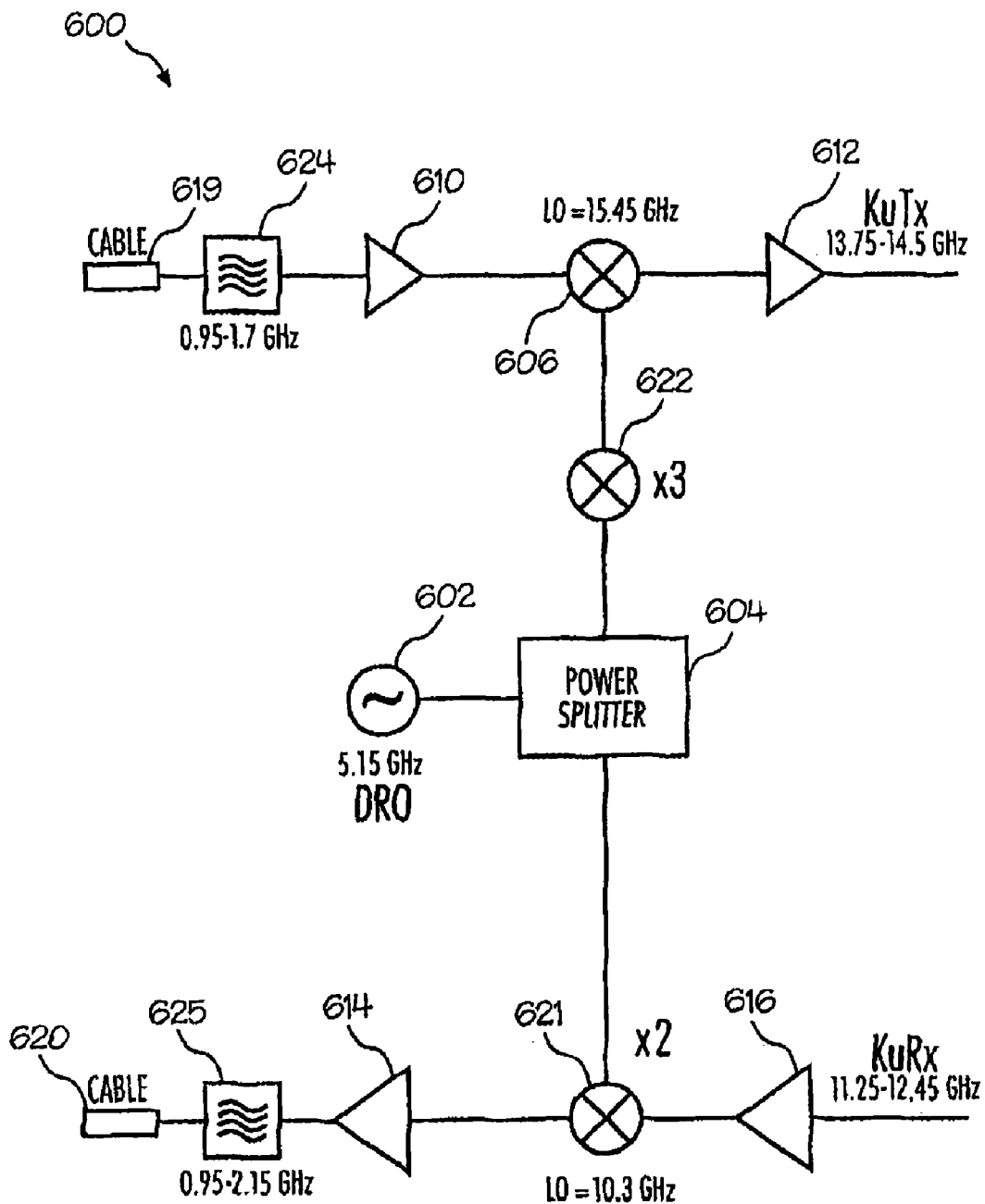
FIGS. 6 and 7 illustrate, in block format, a transceiver system implementing an exemplary low side/high side combination LO frequency plan in accordance with an embodiment of the invention.

FIG. 6 illustrates, in block format, a transceiver system 600 according to yet another embodiment of the invention. System 600 includes substantially the same elements as the previous exemplary systems, such as a single LO 602, a power splitter 604, a plurality of mixers, 606, 621 and 622, a plurality of amplifiers 610-616, a plurality of filters 624 and 625, and cables 519 and 520, and thus their functions will not be described again.

The embodied exemplary frequency plan of system 600 is shown and described with specific frequency ranges to assist in understanding the versatility of the invention. System 600 implements a transceiver frequency plan in accordance with the invention and, in this particular embodiment, a combination of high side and low side frequency plans is illustrated. In other words, one arm of the system receives or transmits at lower frequencies than the multiplied LO signal frequency (i.e., high side), and the other arm receives or transmits at higher frequencies than the multiplied LO signal frequency (i.e., low side). In the present example, the transmitting arm is the high side and the receiving arm is the low side. Additionally, the multipliers are configured to provide a two-thirds relationship between the frequencies of their respective signal outputs. As will be demonstrated in the following examples, numerous variations of the frequency relationship as well as frequency ranges are available.

Figure 7:
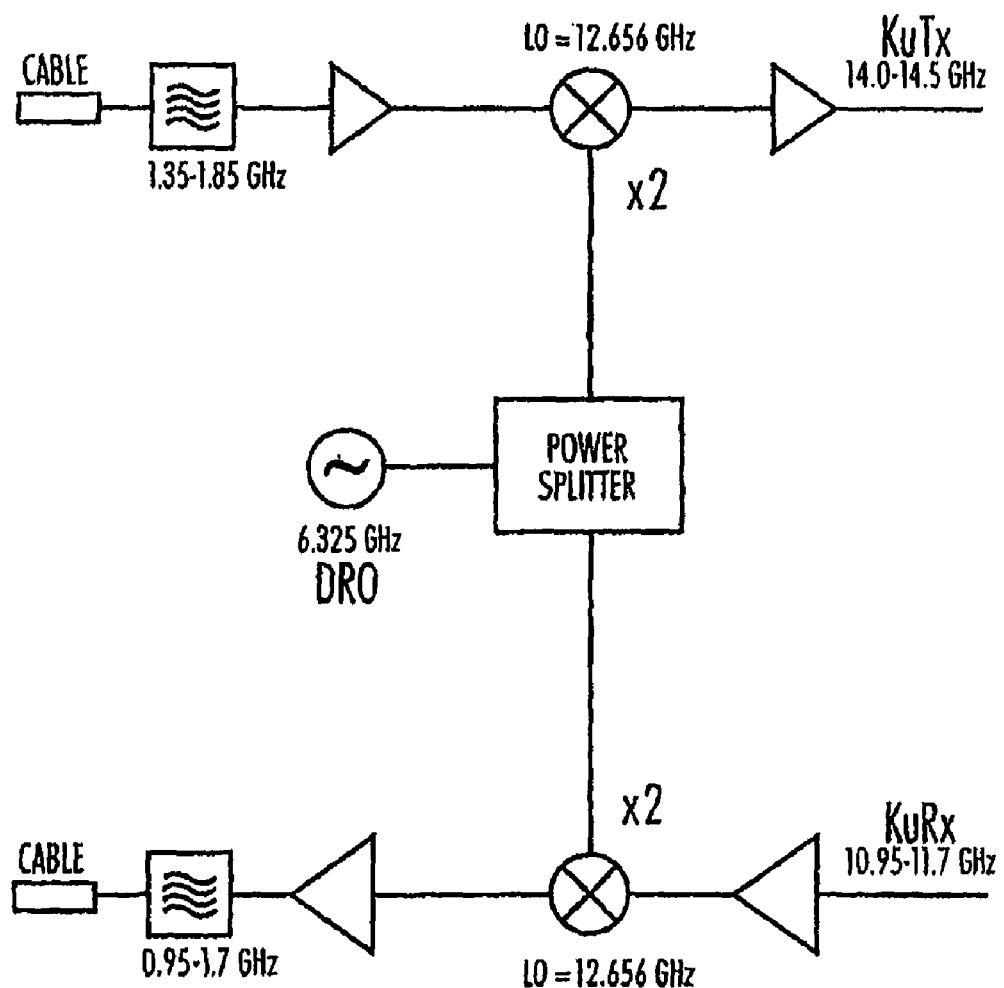

Referring now to FIG. 7, a transceiver system 700 in accordance with still another exemplary embodiment is illustrated. System 700 implements a transceiver frequency plan of the invention and, in this particular example, the transmitting arm is low side and the receiving arm is high side. The multipliers of system 700 are configured to provide a one-to-one relationship between the respective output frequencies.

Figure 8:
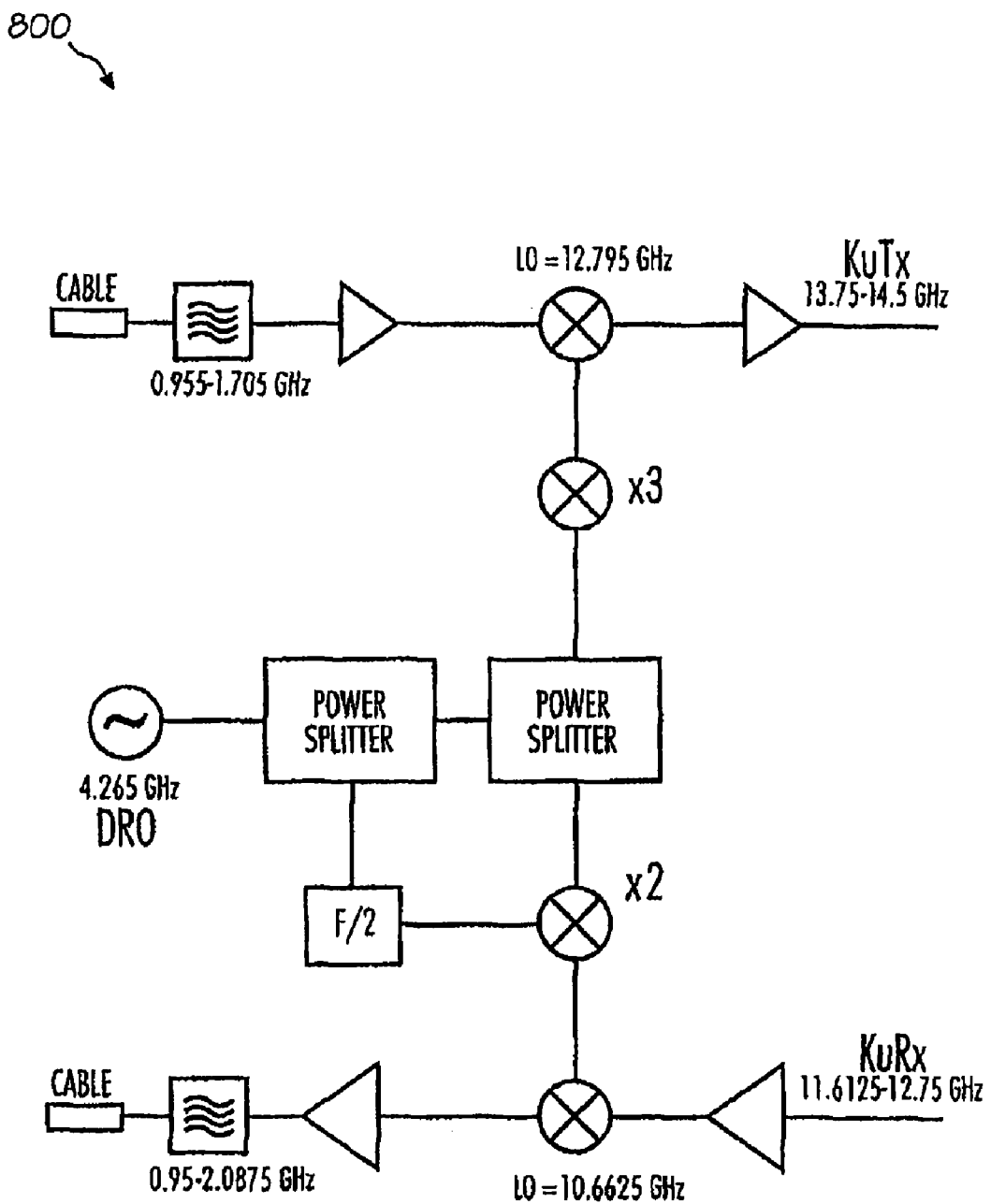

FIG. 8 illustrates a transceiver system 800 according to another exemplary embodiment of the invention. Similar to the previous three examples, system 800 is operating in the Ku band frequency ranges. Also similar to the previous examples, system 800 is configured to provide a M-N relationship between the output frequencies. In this particular example, a two and one half-to-three ("2.5-3") relationship is illustrated. One way to accomplish the half-frequency signal is to use a frequency divider (i.e., illustrated as block "F/2" on FIG. 8). There are various methods for frequency division that are suitable, e.g., implementing a flip-flop; a regenerative feedback type divider. While a half-frequency signal is illustrated in exemplary system 800, frequency division for other ratios ("F/n") is equally available in a frequency plan of the invention.

In various exemplary embodiments the transceiver system includes a receiver portion configured to receive an RF receive signal(s) from an external device (not shown) such as, for example, a satellite. In one exemplary embodiment, the receive portion may be any device and/or component(s) suitably configured to receive an RF receive signal. In an exemplary embodiment, such as when the transceiver system is in communication with a satellite, the RF receive signal (i.e., the RF signal from the satellite) does not drift. In telecommunications, frequency drift is often an unintended and generally arbitrary offset of an oscillator from its nominal frequency.

In various exemplary embodiments, the transceiver system is self correcting. Since the RF receive signal is known to be a stable frequency and/or set of frequencies that do not experience drift, the local oscillator and/or local oscillator signal (used by both the transmit portion and the receive portion of the transceiver) can be allowed to be relatively unstable (e.g. experience drift, be a free running local oscillator, and/or experience astable mode operation) as long as the error of the transmit LO and receive LO are correlated the transmit frequency error can be corrected by measuring the receive error. Thus, a relatively inexpensive oscillator having an output with less stringent tolerances may be implemented.

Stated another way, in accordance with an exemplary embodiment, a self correcting transceiver system may comprise any transceiver system where the oscillator signal to the transmit portion and the oscillator signal to the receive portion are allowed to drift—so long as the transmit error and the receive error are correlated or have a known relationship. In one exemplary embodiment, the correlation or known relationship arises due to the transmit and receive oscillator signals being derived off the same free running oscillator. In another exemplary embodiment, the correlation or known relationship arises when the transmit and receive oscillator signals are phase locked to the same reference oscillator which is allowed to drift.

In accordance with an exemplary embodiment, the LO signal is mixed with the RF receive signal in the receive portion to create an IF receive signal. The IF receive signal may be provided to, for example, a modem. In one exemplary embodiment, the modem may comprise a frequency correction component. In another exemplary embodiment, the frequency correction component may be located in any suitable location. In accordance with an exemplary embodiment, the frequency correction component is configured to detect if the IF receive signal has drifted from an expected base frequency.

In one exemplary embodiment, the RF carrier frequency is known to be accurate based on the stable satellite LO frequency reference. In one exemplary embodiment, the receive IF frequency error can be assumed to be entirely due to the transceiver LO drift. A comparison the receive IF frequency with a reference, such as a known and accurate modulation symbol rate, may result in determination of the LO error. In an alternative embodiment, the receive IF frequency may be compared to the known accurate receive RF frequency to determine the LO error. However, the RF frequency is much higher and thus more difficult to measure.

In one exemplary embodiment, the transceiver is configured to use two known frequency references to facilitate frequency correction. The first is the receive RF carrier frequency, which is accurate due to the high stability of the satellite LO. The second is the modulation symbol rate (i.e., the data rate), which is sent from the hub at a very accurate known rate. In this exemplary embodiment, a frequency reference is created using the modulation symbol rate as one known frequency reference. This frequency reference may then be compared to the receive IF frequency reference. The difference between the two may be identified as an error amount. This error is assumed to all be from the transceiver LO drift. This assumption is a reasonable approximation for a first order analysis.

In another exemplary embodiment, the transceiver is again configured to use two known frequency references. The first is an accurate frequency reference in the indoor unit and the second is the modulation symbol rate. A comparison of these two frequency references can be used to create a detected error that may be assumed to be related to the transceiver LO drift.

If the IF receive signal exhibits drift, that drift must be due to drift in the LO signal. However, contrary to the prior art that endeavors to reduce such LO drift, here such drift is acceptable. Thus, in accordance with an exemplary embodiment, the local oscillator and/or local oscillator signal is allowed to drift. For example, the local oscillator may be an inexpensive LO that is know to drift. In other exemplary embodiments, the LO is not phase locked. In other words, the local oscillator signal that is mixed with the IF transmit signal and RF receive signal is not pinned using a Phase Lock Loop. In another exemplary embodiment, the LO signals to the transmit and receive portions may be phase locked to a LO that is allowed to drift. Stated another way, the LO signals used for up/down conversion in both the transmit portion and receive portion drift together. Stated yet another way, the system is configured such that frequency drift is acceptable as long as the transmit frequency drift and the receive frequency drift are correlated.

The transceiver system in general, and in an exemplary embodiment, the frequency correction device, is configured to perform frequency correction to compensate for drift in the LO. This frequency correction may be based on the drift detected in the IF receive signal. Stated more generally, in various exemplary embodiments, a reference signal, such as the RF receive signal, may be used to calculate and/or correct for error within the system.

For instance, in an exemplary embodiment, the frequency of the transmit IF signal, may be adjusted based on the calculated LO error so that the transmit RF output of the transceiver can still be transmitted exactly on the desired RF frequency. In one exemplary embodiment, the transmit IF signal is an output of a modem. In an exemplary embodiment, the IF transmit signal is frequency pre-corrected by the amount of the oscillator drift as such is determined from the drift in the IF receive signal. Pre-correcting the frequency of the IF transmit signal eliminates the effect of the drift in the oscillator signal in the RF transmit signal.

This pre-correcting may occur at any location in the system prior to the final upconversion. For example, in one exemplary embodiment, the IF transmit signal is pre-corrected in the modem indoor unit. In another exemplary embodiment, the IF transmit signal is pre-corrected in the transceiver prior to up-conversion in a first mixer of the transmitter portion. In another exemplary embodiment, the IF transmit signal is pre-corrected in the modulator or digitally prior to modulation.

Thus, in an exemplary embodiment, a frequency correction device is configured to pre-correct an IF transmit signal based on drift detected in the IF receive signal. Thus, the frequency correction device is configured to facilitate self correction for any drift by the common transmit portion/receive portion oscillator signal.

Figure 9A:
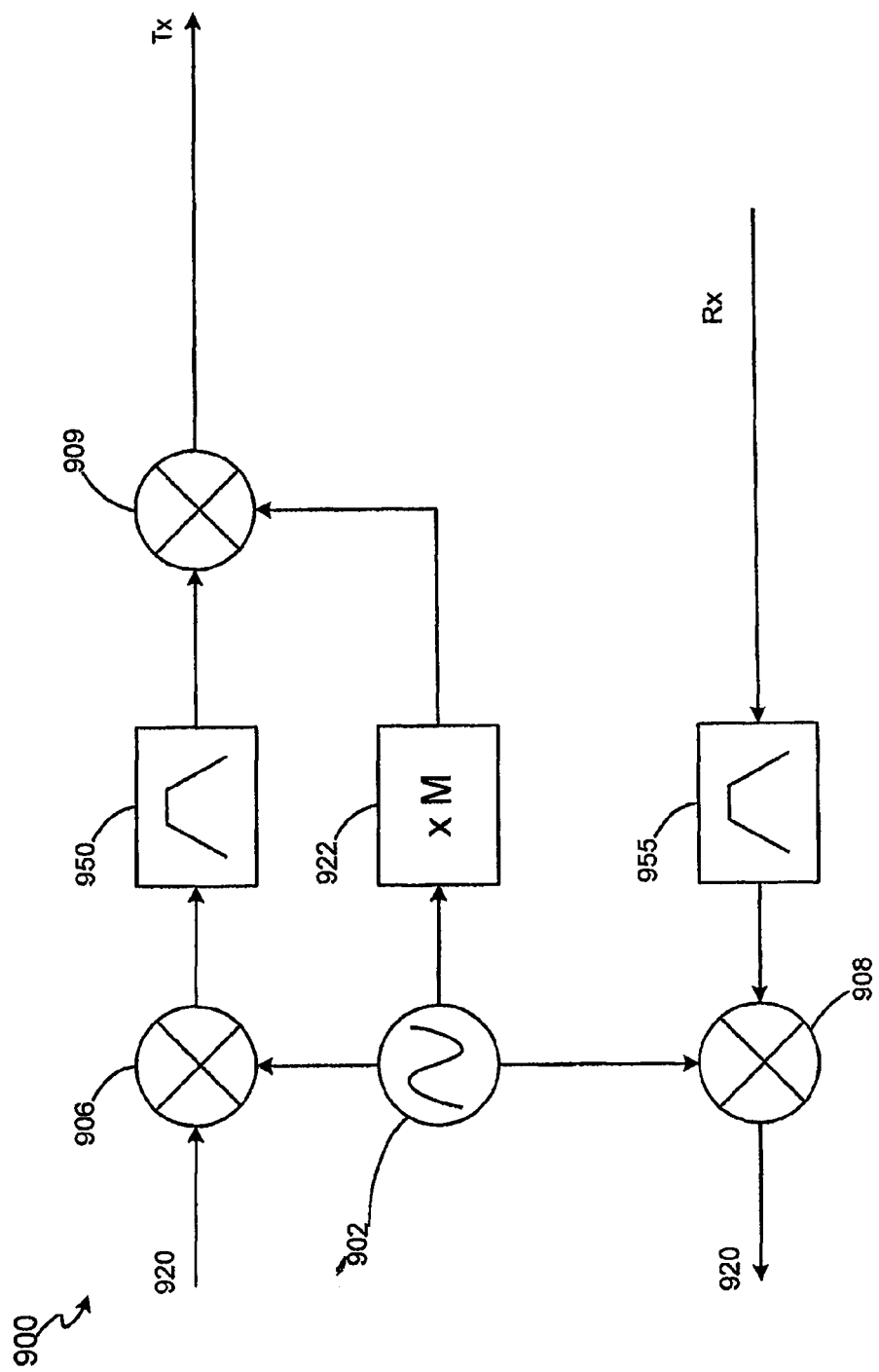
FIGS. 9A-9C illustrate, in block format, transceiver systems implementing dual super-heterodyne circuits in accordance with embodiments of the invention.
Figure 9B:
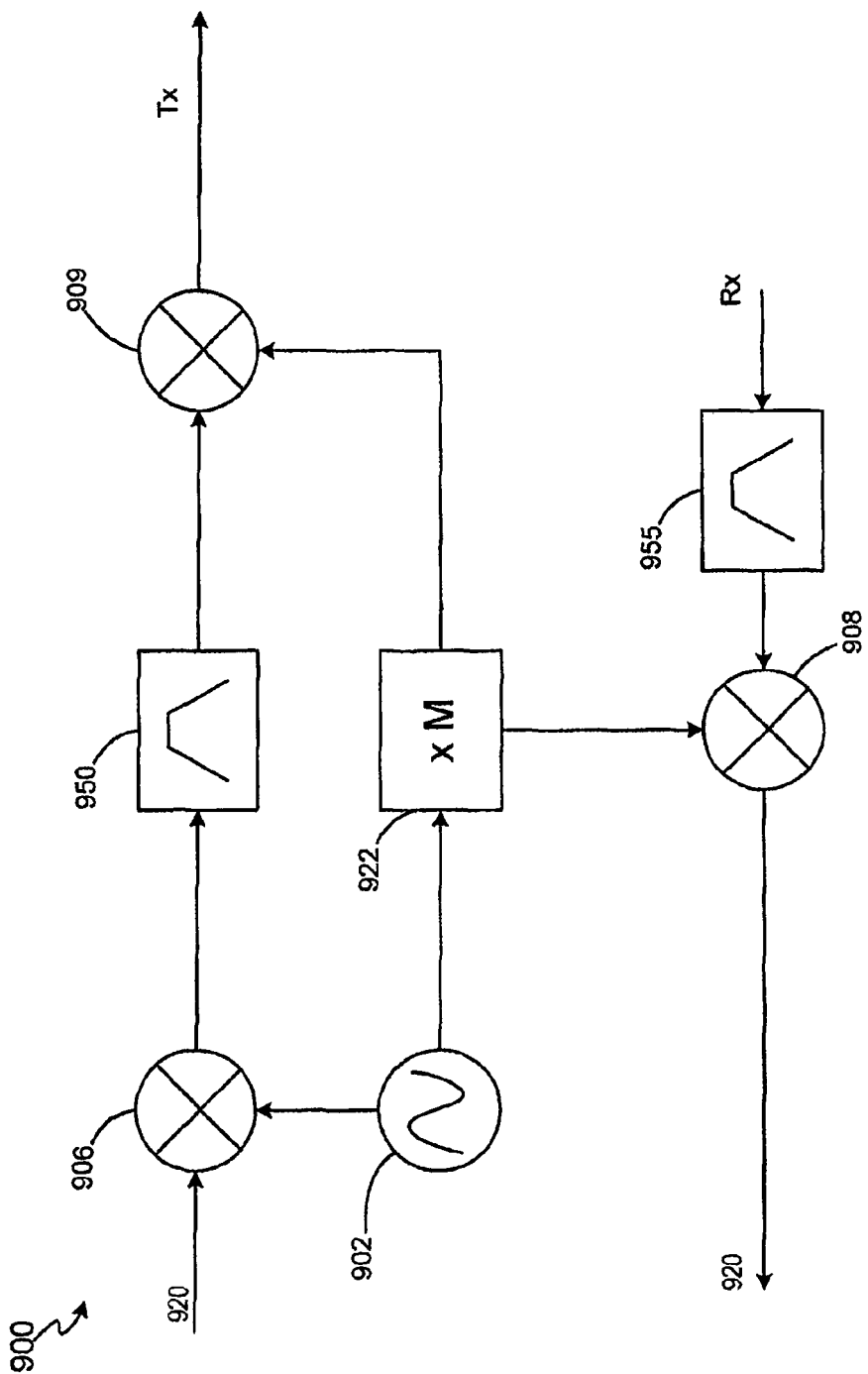
Figure 9C:
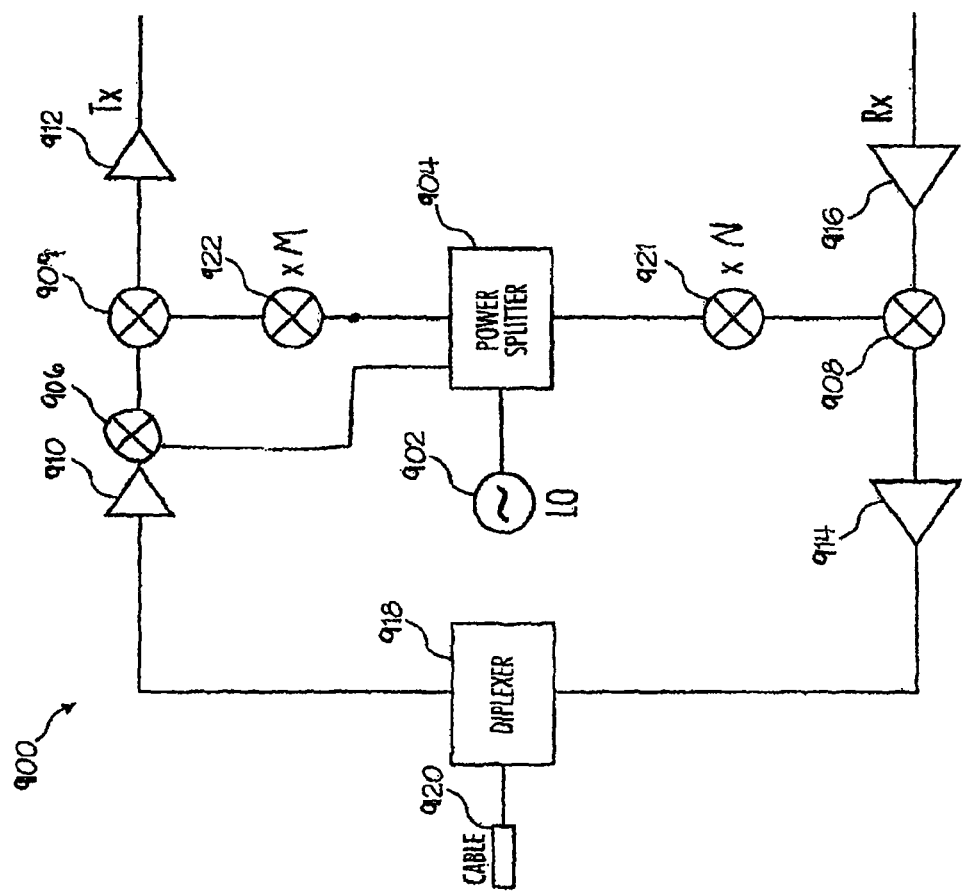

In various exemplary embodiments, and with reference to FIGS. 9A-9C, a transceiver employing frequency correction as described herein may further be implemented as a dual super-heterodyne transceiver. The dual super-heterodyne configuration may be employed, for example, in the transmit portion of the transceiver. In another exemplary embodiment, the dual super-heterodyne configuration may be employed, in the receive portion of the transceiver.

In radio and signal processing, heterodyning is the generation of new frequencies by mixing, or multiplying, two oscillating waveforms. It may be useful for modulation and demodulation of signals, or placing information of interest into a useful frequency range. In various exemplary embodiments, the two frequencies are mixed in a transistor, diode, mixer, or other signal processing device. In one exemplary embodiment, mixing two frequencies creates two new frequencies, according to the properties of the sine function: one at the sum of the two frequencies mixed, and the other at their difference. These new frequencies are called heterodynes. Typically only one of the new frequencies is desired—the higher one after modulation and the lower one after demodulation. The other signal may be filtered out of the output of the mixer. That said, the opposite implementation may also be used, where the lower one is used for upconversion and the higher one is used for down conversion.

In one exemplary embodiment, the dual super-heterodyne configuration may include at least one local oscillator 902 and/or a local oscillator signal from local oscillator 902. In accordance with an exemplary embodiment, transceiver 900 comprises a local oscillator 902 configured to create an oscillator signal. In another exemplary embodiment, transceiver 900 does not comprise an oscillator 902, but rather just comprises the oscillator signal. This may occur, for example, where the oscillator generating the oscillator signal is located outside transceiver 900. In either event, the oscillator signal may be allowed to drift.

Transceiver 900 may further comprise a transmit portion and a receive portion. Transmit portion may comprise a first mixer 906, and a second mixer 909. Consistent with the dual super-heterodyne configuration, the up-conversion in the transmit portion is performed by two or more mixers. The first mixer up-converts the IF transmit signal partially, and the second mixer completes the up-conversion. In an exemplary embodiment, mixer 906 up-converts with the LO signal and mixer 909 up-converts with a scaled version of the LO signal.

The receive portion may comprise a third mixer 908. Moreover, in various exemplary embodiments, the transmit portion may comprise a multiplier 922. In an exemplary embodiment, each mixer 906, 909, and 908 receives either the LO signal or a scaled version of the LO signal. In another exemplary embodiment, in place of or in addition to receiving a scaled version of the LO signal, any of mixers 906, 909, and 908 may be configured as a harmonic mixer configured to both scale the oscillator signal and mix the scaled oscillator signal with the input signal.

Each of mixers 906-909, and multipliers 922 and 921 are represented in FIGS. 9A-9C as a single element, however, it should be appreciated that each element merely demonstrates the function and is not intended to limit the scope to a single element. In fact, the multipliers may comprise several elements and/or stages of multiplication. Additionally, the term mixers may include multipliers, modulators and/or mixers. Frequency multipliers (doublers) and their intended functions are well known in the industry and will not be discussed in detail.

In an exemplary embodiment, and with reference to FIG. 9A-9C, a first transmit mixer 906 receives an IF transmit signal (provided for example from a modem) and an LO signal provided from LO 902. In accordance with an exemplary embodiment, mixer 906 mixes the signals and produces a signal that is either the sum or the difference of the IF and LO frequency signals. In a similar manner, and with reference to FIG. 9A, receive mixer 908 combines an RF receive signal with the LO signal to produce an IF frequency signal 921. The IF receive signal 921 may be provided to a modem, for example.

Transceiver 900 may further comprise a filter 950 in the transmit portion. Transceiver 900 may further comprise a filter 955 in the receive portion. Filters 950 and 955, similar to filters 308 and 309, may comprise any suitable band-pass filter. In general, filters are included to exclude spurious signals which commonly occur after mixing, splitting and/or dividing signals. Moreover, in an exemplary embodiment, filter 950 is located entirely on chip. In accordance with an exemplary embodiment, filter 950 is located between first and second mixers 906 and 909, respectively. Filters 950 and 955 suitably filter out signals not having a frequency within a pre-determined range and or ranges. Filters 950 and 955 suitably filter out spurs from their input signals. In one embodiment, the output of filters 950 and/or 955 may be amplified by amplifiers to account for any power loss.

In one exemplary embodiment, and with reference to FIG. 9C, the signal from local oscillator 902 may be split into substantially equal frequency signals by using a power splitter 904. In one exemplary embodiment, a power splitter may comprise any suitable component or combination of components configured to divide a power signal into two or more signals. In general, the signals resulting from the power splitter have a frequency equal to or substantially equal to the frequency of the original LO 902 signal. However, the signals resulting from the power splitter such as power splitter 904 may be any desired frequency level which may be greater than, less than or substantially equal to the frequency of the original signal. In one exemplary embodiment, (again with reference to FIGS. 9A and 9B), two signals are brought from LO 902 without the use of a power splitter. These signals may be any desired frequency level which may be greater than, less than or substantially equal frequency of the original LO 902 signal. In general, these signals brought from LO 902 have a frequency equal to or substantially equal to the frequency of the original LO 902 signal. It should be noted that portions of the circuits reference in FIGS. 9A-9C can be implemented individually and/or simultaneously.

In various exemplary embodiments, transceiver is fully duplexed and comprises a diplexer 918. In this embodiment, signals to and from, for example, a modem, may be passed over a cable 920. In one exemplary embodiment, and with momentary reference to FIG. 9C, transceiver 900 may further comprise a cable 920. The IF transmit signal may be provided over a cable 920 by way of a diplexer 918. Cable 920, similar to cable 120, may be any suitable cable used for signal transmission. As stated above, in general, a low cost, readily available cable is often desirable. In this manner, another advantage of this particular embodiment relates to the ability to transmit multiple signals over a single cable with each signal transmitting at or below the desired 3 GHz. In another exemplary embodiment, transceiver 900 is a non-duplexed system.

One advantage of this particular embodiment is the ability to transmit multiple IF signals, having different frequencies, onto a single cable without risking interference among the signals. The unique frequency plan of the invention helps to enable this to occur by providing sufficient separation in frequency between the multiple IF signals to avoid interference. In various embodiments of the invention, a relationship between the LO signal frequencies is established such as (M+X)/N or M/(X+N), where X is equivalent to the number of additional local oscillator signals mixed in the transceiver portion not including the multiplied LO signal. M and N may be equivalent or different integers. N may not be zero. For example, one signal is multiplied to be two times the original LO frequency plus the original LO frequency and a second signal is multiplied to be two times the LO frequency, thus resulting in a two-thirds relationship between the signal frequencies. In one exemplary embodiment M/N is any ratio other than +1. Alternatively, in the case where a power splitter splits the signal from LO 902 into two signals, one of the signals coming from the power splitter may be scaled by a frequency of a desired percentage that is not substantially the same as the frequency of the other signal coming from the power splitter.

In another exemplary embodiment, and with reference to FIG. 9C, the frequency plan in accordance with the invention further includes amplifiers 910-916. Amplifiers 910-916 may comprise any known or discovered amplification device(s) or element(s). Amplifiers may be included in the "transmitting arm" of the system and/or amplifiers may suitably be included in the "receiving arm" of the system. Typically there is some loss associated with transceiving systems of the type depicted in FIGS. 9A-9C. Signal loss may be due to line loss, interference, signal splitting and combining, and various other causes well known in the communications industry. Amplifiers may be suitably configured to account for any signal loss and amplify the signals accordingly.

In an exemplary embodiment, the dual super-heterodyne circuit configuration or other previously described circuit configurations may include one or more duplexer(s), such as for bi-directional communications (duplex). The duplexer may be any suitable duplexer designed for operation in the frequency band used by the receive signal and/or transmit signal. In various exemplary embodiments, the duplexer is capable of handling the output power of the transmitter. The duplexer may provide adequate rejection of transmitter noise occurring at the receive frequency, and may be designed to operate at, or less than, the frequency separation between the transmitter and receiver. Additionally, the duplexer may provide sufficient isolation to prevent receiver desensitization. Alternatively, in another exemplary embodiment, the above referenced circuits may not include a duplexer.

In one exemplary embodiment, the transceiver system does not include a phase locked loop (PLL). In another exemplary embodiment, neither the first signal, nor the second oscillator signals are scaled in frequency using a phase locked loop. Also, in an exemplary embodiment, the transceiver system does not include a numerically-controlled oscillator (NCO). The receiver portion and/or the transmitter portion could include a dual super-heterodyne configuration portion.

While not depicted in the Figures, a communications system such as any of the previously described systems or their equivalents may suitably include additional back end and front end systems which are generally well known in the communications industry, e.g., a signal detector, modem, and/or frequency counter, and additional elements such as filtering devices. It should be appreciated that the particular implementations shown and described herein are illustrative of various embodiments of the invention including its best mode, and are not intended to limit the scope of the present invention in any way. For example, the systems and methods for frequency plans described herein may include industry and non-industry standard transmit and receive frequencies, K band, Ka band and Ku band frequencies, as well as other frequency bands. Additionally, various examples of transceiver frequency plans having varying signal output relationships have been demonstrated and described, and it should be recognized that the provided examples are not intended to be limiting, but rather demonstrative of the versatility of the invention.

For the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

While the principles of the invention have now been made clear in illustrative embodiments, there will be immediately obvious to those skilled in the art many modifications of structure, arrangements, proportions, elements, materials and components, used in the practice of the invention which are particularly adapted for a specific environment and operating requirements without departing from those principles. These and other changes or modifications are intended to be included within the scope of the present invention, as expressed in the following claims.

Additional Description:

A fully duplexed transceiver having a transmit portion and a receive portion, the fully duplexed transceiver may include: (1) a single oscillator, associated with the fully duplexed transceiver, configured to generate an oscillator signal at a desired frequency; (2) a power splitter configured to receive the oscillator signal and to divide the signal into first and second signals; and (3) a first multiplier configured to receive the first signal and to scale the frequency of the first signal by a factor of M, wherein the first signal, as scaled, is used for frequency conversion in the transmit portion of the fully duplexed transceiver, wherein the second signal is used for frequency conversion in the receive portion of the fully duplexed transceiver, wherein the first and second signals are not scaled in frequency using a phase lock loop, and wherein M is any rational number other than 0 and 1. A second multiplier may be configured to receive said second signal and to scale the frequency of the second signal by a factor of N, wherein the second signal, as scaled, is used for frequency conversion in the receive portion of the fully duplexed transceiver, wherein N is any rational number other than 0, and wherein the ratio of M/N is any ratio other than 1. M to N may be the ratio of the transmit to receive frequency conversion. M may be equal to 2 and N may be equal to 1. M may be equal to 3 and N may be equal to 1. One of the first and second multipliers may be implemented as part of a harmonic mixer configuration.

A ground satellite communication system, the system may include: (1) an indoor unit and an outdoor unit in communication with said indoor unit, said outdoor unit comprising a transceiver system having: (1) a single oscillator, associated with a fully duplexed transceiver, configured to generate a first oscillator signal and a second oscillator signal, wherein said first and second oscillator signals are not scaled in frequency using a phase lock loop, wherein an M/N relationship exists between the frequencies of said first oscillator signal and said second oscillator signal, wherein M and N are each rational numbers other than zero, and wherein the ratio of M/N is any ratio other than 1; (2) a receiving section configured to utilize said first oscillator signal to facilitate frequency conversion in said receive section; and (3) a transmitting section configured to utilize said second oscillator signal to facilitate frequency conversion in said transmit section. A multiplier may be configured to scale the frequency of at least one of the first and second oscillator signals such that the first and second oscillator signals have different frequencies from each other. A harmonic mixer may be configured to scale the frequency of at least one of the first and second oscillator signals so that the first and second oscillator signals have different frequencies from each other. M may be equal to 2 and N may be equal to 1. M may be equal to 3 and N may be equal to 1. The multiplier may be implemented as part of a harmonic mixer configuration.

A ground satellite communication system, the system may include: an indoor unit and an outdoor unit in communication with the indoor unit, the outdoor unit comprising a transceiver system having: (A) a single oscillator, associated with a fully duplexed transceiver, configured to generate a first oscillator signal and a second oscillator signal, and wherein the first oscillator signal is substantially equal to the second oscillator signal; (B) a receiving section configured to utilize the second oscillator signal to facilitate frequency conversion in the receive section; and (C) a transmitting section configured to utilize the first oscillator signal to facilitate frequency conversion in the transmit section; and wherein at least one of: (1) the first oscillator signal is mixed with an Intermediate Frequency ("IF") transmit signal to create a sum frequency transmit output signal, and wherein the second oscillator signal is mixed with a radio frequency ("RF") receive signal to create a difference frequency receive output signal; and (2) the first oscillator signal is mixed with an IF transmit signal to create a difference frequency transmit output signal, and wherein the second oscillator signal is mixed with a RF receive signal to create a sum frequency receive output signal. The single oscillator may be a free running local oscillator and wherein the free running local oscillator is allowed to drift.

A signal transceiving method may include: (1) receiving a receive signal having a first frequency; (2) receiving a transmit signal having a second frequency; (3) generating an oscillator signal from an oscillator that is associated with a fully duplexed transceiver; (4) splitting the oscillator signal into a first signal and a second signal, wherein the first and second signals are not scaled in frequency using a phase lock loop; (5) scaling the frequency of the first signal to obtain a desired multiple of the first signal; (6) scaling the frequency of the second signal to obtain a desired multiple of the second signal, wherein an M/N relationship exists between the scaled frequencies of the first signal and the second signal, wherein M and N are each rational numbers other than 0, and wherein the ratio of M/N is any ratio other than 1; and (7) mixing the receive signal and the transmit signal respectively with the scaled versions of the first and second signals to facilitate frequency conversion in a receive section of the transceiver and a transmit section of the transceiver, respectively. A fully duplexed transceiver comprising both a transmit portion and a receive portion, and wherein said transmit portion comprises a first mixer and wherein said receive portion comprises a second mixer, wherein an oscillator signal is mixed with an intermediate frequency ("IF") transmit signal in said first mixer and wherein said oscillator signal is mixed with a radio frequency ("RF") receive signal in said second mixer, wherein the frequency of said IF transmit signal is different from the frequency of said RF receive signal, and wherein at least one of: (1) said first mixer adds said oscillator signal to said IF transmit signal, in the frequency domain, and wherein said second mixer subtracts said oscillator signal from said RF receive signal, in the frequency domain; and (2) said first mixer subtracts said oscillator signal from said IF transmit signal, in the frequency domain, and wherein said second mixer adds said oscillator signal to said RF receive signal, in the frequency domain.

A fully duplexed transceiver may include both a transmit portion and a receive portion, and wherein the transmit portion comprises a first mixer and wherein the receive portion comprises a second mixer, the fully duplexed transceiver further configured to divide a first oscillator signal into a second oscillator signal and a third oscillator signal, wherein the second and third oscillator signals are not scaled in frequency using a phase lock loop, wherein the second oscillator signal is mixed with an intermediate frequency ("IF") transmit signal in the first mixer, wherein the third oscillator signal is mixed with a radio frequency ("RF") receive signal in the second mixer; wherein the output signal frequency of the transmit portion is not equal to the frequency of the RF receive signal of the receive portion, and wherein the transceiver is configured to frequency scale at least one of the second and third oscillator signals such that the frequencies of the second and third oscillator signals are not equal to each other and such that the mixing of the second and third signals in the respective transmit portion and receive portion is configured to facilitate frequency conversion in at least one of the transmit portion and the receive portion. A harmonic mixer may facilitate the frequency scaling. A multiplier may facilitate the frequency scaling. The first oscillator signal may be generated by a single oscillator, and wherein the single oscillator may be a free running local oscillator. The free running local oscillator may be allowed to drift.

A fully duplexed transceiver having a transmit portion and a receive portion, the fully duplexed transceiver may include: (1) a power splitter configured to receive an oscillator signal and to divide the oscillator signal into first and second signals, each having a frequency substantially equal to the desired frequency of the oscillator signal, wherein the first and second signals are not scaled in frequency using a phase lock loop; and (2) a first multiplier configured to receive the first signal and to scale the frequency of the first signal by a factor of M, wherein the first signal, as scaled, is used for frequency conversion in the receive portion of the fully duplexed transceiver, wherein the second signal is used for frequency conversion in the transmit portion of the fully duplexed transceiver, and wherein M is any rational number other than zero and 1. A fully duplexed transceiver having a transmit portion and a receive portion, the fully duplexed transceiver may include a second multiplier configured to receive the second signal and to scale the frequency of the second signal by a factor of N, wherein the second signal, as scaled, is used for frequency conversion in the transmit portion of the fully duplexed transceiver, wherein N is any rational number other than zero, and wherein the ratio of M/N is any ratio other than 1. M to N may be the ratio of the receive to transmit frequency conversion. M may be equal to 2 and N may be equal to M may be equal to 3 and N may be equal to 1.

A transceiver having a transmit portion configured to transmit a radio frequency ("RF") transmit signal and a receive portion configured to receive a RF receive signal, the transceiver may include: (1) a power splitter configured to receive an oscillator signal and to divide the oscillator signal into first and second signals; and (2) a first multiplier configured to receive the first signal and to scale the frequency of the first signal to create a first scaled signal, wherein the frequencies of the first scaled signal and the second signal are not equal to each other, wherein the first scaled signal is used for frequency conversion in the transmit portion of the transceiver, and wherein the second signal is used for frequency conversion in the receive portion of the transceiver. The transmit frequency conversion may be the result of one of: (i) the sum of an intermediate frequency ("IF') transmit signal frequency and said first scaled signal frequency, and (ii) the difference of said IF transmit signal frequency and the first scaled signal frequency. The receive frequency conversion may be the result of one of: (i) the sum of said RF receive signal frequency and said second scaled signal frequency, and (ii) the difference of said RF receive signal frequency and said second scaled signal frequency.

A ground satellite communication system, the system may include: (A) an indoor unit; and (B) an outdoor unit in communication with the indoor unit, the outdoor unit comprising a transceiver system having: (1) a transceiver, wherein the transceiver is configured to divide a first oscillator signal into a second oscillator signal and a third oscillator signal, wherein the transceiver is configured to perform frequency scaling such that the second and third oscillator signals have different frequencies from each other, the transceiver further comprising: (2) a receive portion, wherein the receive portion is configured to utilize the second oscillator signal to facilitate frequency conversion in the receive portion; and (3) a transmit portion, wherein the transmit portion is configured to utilize the third oscillator signal to facilitate frequency conversion in the transmit portion. The relationship between the frequencies of the second and third oscillator signals may be the ratio of the receive to transmit frequency conversion.

A ground satellite communication system, the system may include: (A) an indoor unit; and (B) an outdoor unit in communication with the indoor unit, the outdoor unit comprising a transceiver system having: (1) a transceiver; (2) an oscillator, associated with the transceiver, wherein the oscillator is configured to generate a first oscillator signal and a second oscillator signal, the transceiver further comprising: (3) a receive portion, wherein the receive portion is configured to utilize the second oscillator signal to facilitate frequency conversion in the receive portion; and (4) a transmit portion, wherein the transmit portion is configured to utilize the first oscillator signal to facilitate frequency conversion in the transmit portion; and wherein one of: (i) the first oscillator signal is mixed with an intermediate frequency ("IF") transmit signal to create a sum frequency radio frequency ("RF") transmit signal, and wherein the second oscillator signal is mixed with a RF receive signal to create a difference frequency IF receive signal; and (ii) the first oscillator signal is mixed with an IF transmit signal to create a difference frequency RF transmit signal, and wherein the second oscillator signal is mixed with a RF receive signal to create a sum frequency IF receive signal. A harmonic mixer may be configured to scale the frequency of at least one of the first and second oscillator signals so that the first and second oscillator signals have different frequencies from each other.

A signal transceiving method which may include: (1) splitting an oscillator signal into a first signal and a second signal; (2) scaling the frequency of the first signal to obtain a desired multiple of the first signal; (3) scaling the frequency of the second signal to obtain a desired multiple of the second signal, wherein an M/N relationship exists between the scaled frequencies of the first signal and the second signal, wherein M and N are each rational numbers, wherein M does not equal zero, wherein N does not equal zero, and wherein the ratio of M/N is any ratio other than +1; and (4) mixing a radio frequency ("RF") receive signal, received at a receive portion of the transceiver, with the scaled version of the first signal to facilitate frequency conversion in the receive portion of the transceiver; and (5) mixing an intermediate frequency ("IF") transmit signal, received at a transmit portion of the transceiver, with the scaled version of the second signal to facilitate frequency conversion in the transmit portion of the transceiver; wherein the RF receive signal is not equal to a RF transmit signal that is output from the receive portion. The transmit frequency conversion may be the result of one of: (i) the sum of an intermediate frequency ("IF") transmit signal frequency and the frequency of the scaled version of the second signal, and (ii) the difference of the IF transmit signal frequency and the frequency of the scaled version of the second signal. The receive frequency conversion may be the result of one of: (i) the sum of the RF receive signal frequency and the frequency of the scaled version of the first signal, and (ii) the difference of the RF receive signal frequency and the frequency of the scaled version of the first signal.

A transceiver may include: (1) a transmit portion and a receive portion, wherein the transmit portion outputs a radio frequency ("RF") transmit signal, wherein the receive portion outputs a RF receive portion signal, wherein the transmit portion comprises a first mixer, and wherein the receive portion comprises a second mixer; and (2) an oscillator, wherein a signal from the oscillator is mixed with an intermediate frequency ("IF") transmit signal in the first mixer, wherein the signal from the oscillator is mixed with a RF receive signal in the second mixer; wherein the frequency of the RF transmit signal is different from the frequency of the RF receive signal, and wherein at least one of: (A) the first mixer adds the signal of the oscillator to the IF transmit signal, in the frequency domain, and wherein the second mixer subtracts the signal of the oscillator from the RF receive signal, in the frequency domain; and (B) the first mixer subtracts the signal of the oscillator from the IF transmit signal, in the frequency domain, and wherein the second mixer adds the signal of the oscillator to the RF receive signal, in the frequency domain. The oscillator may be a free running local oscillator, wherein the free running local oscillator is allowed to drift, and wherein the oscillator is not phase locked to a reference oscillator.

A transceiver may include: (1) a transmit portion and a receive portion, wherein the transmit portion comprises a first mixer and wherein the receive portion comprises a second mixer; and (2) an oscillator, wherein the oscillator is configured to generate a first oscillator signal, wherein the transceiver is configured to divide the first oscillator signal into a second oscillator signal and a third oscillator signal, wherein the second oscillator signal is mixed with an intermediate frequency ("IF") transmit signal in the first mixer, wherein the third oscillator signal is mixed with a radio frequency ("RF") receive signal in the second mixer; wherein an RF transmit signal frequency output from the transmit portion is not equal to the frequency of the RF receive signal received at the receive portion, and wherein the transceiver is configured to frequency scale at least one of the second and third oscillator signals such that the frequencies of the second and third oscillator signals are not equal to each other and such that the mixing of the second and third signals in the respective transmit portion and receive portion is configured to facilitate frequency conversion in at least one of the transmit portion and the receive portion. The oscillator may be a free running local oscillator, wherein the free running local oscillator is allowed to drift, and wherein the oscillator is not phase locked to a reference oscillator.

A transceiver having a transmit portion and a receive portion, the transceiver may include: (1) a power splitter configured to receive an oscillator signal and to divide the oscillator signal into first and second signals; and (2) a first multiplier configured to receive the first signal and to scale the frequency of the first signal to create a first scaled signal, wherein the frequencies of the first scaled signal and the second signal are not equal to each other, wherein the first scaled signal is used for frequency conversion in the receive portion of the transceiver, and wherein the second signal is used for frequency conversion in the transmit portion of the transceiver. An oscillator may be configured to generate the oscillator signal, wherein the oscillator is a free running local oscillator, wherein the free running local oscillator is allowed to drift, and wherein the oscillator is not phase locked to a reference oscillator.

The invention claimed is:

1. A transceiver having a transmit portion configured to transmit a radio frequency ("RF") transmit signal and a receive portion configured to receive a RF receive signal, said transceiver comprising:
   a power splitter configured to receive an oscillator signal and to divide said oscillator signal into first and second signals; and
   a first multiplier configured to receive said first signal and to scale the frequency of said first signal by a factor of M to create a first scaled signal, wherein the frequencies of said first scaled signal and said second signal are not equal to each other,
   wherein said first scaled signal is used for frequency conversion in the transmit portion of said transceiver, wherein said second signal is used for frequency conversion in the receive portion of said transceiver, wherein M is any rational integer number other than 0 and 1, wherein the frequency of said oscillator signal is allowed to drift, and wherein, with the exception of the drift in the frequency of said oscillator signal, the frequency of said oscillator signal is the same frequency for both transmit and receive operations.

2. A transceiver having a transmit portion configured to transmit a radio frequency ("RF") transmit signal and a receive portion configured to receive a RF receive signal, said transceiver comprising:
   a power splitter configured to receive an oscillator signal and to divide said oscillator signal into first and second signals; and
   a first multiplier configured to receive said first signal and to scale the frequency of said first signal to create a first scaled signal, wherein the frequencies of said first scaled signal and said second signal are not equal to each other,
   wherein said first scaled signal is used for frequency conversion in the transmit portion of said transceiver, and wherein said second signal is used for frequency conversion in the receive portion of said transceiver;
   wherein:
   (A) the transmit frequency conversion is the result of one of: (i) the sum of an intermediate frequency ("IF") transmit signal frequency and said first scaled signal frequency, and (ii) the difference of said IF transmit signal frequency and the first scaled signal frequency; and simultaneously
   (B) the receive frequency conversion is the result of one of: (i) the sum of said RF receive signal frequency and said second signal frequency, and (ii) the difference of said RF receive signal frequency and said second signal frequency.

3. The transceiver of claim 1, wherein said transmit portion further comprises a dual super-heterodyne configuration.

4. The transceiver of claim 1, wherein said transceiver further comprises a duplexer configured to provide full duplex communication.

5. The transceiver of claim 1, wherein a first drift in said first signal is correlated to a second drift in said second signal, and wherein a transmit IF signal is frequency corrected to compensate for drift in said oscillator signal, and wherein said transmit IF signal is frequency corrected before said frequency conversion in the transmit portion.

6. The transceiver of claim 1, further comprising a frequency correction device configured to: identify frequency drift in a receive portion; and pre-correct an IF transmit signal such that an RF transmit signal output of the transmit portion is frequency corrected to account for drift in said oscillator signal.

7. The transceiver of claim 1, wherein said receiver and transmitter receive an oscillating signal from a common source that is scaled differently for said transmitter than for said receiver.

8. The transceiver of claim 1, wherein said receiver and transmitter receive an oscillating signal from a free running local oscillator.

9. The transceiver of claim 1, wherein the power splitter is further configured to create a third signal substantially equal to said first signal; wherein said third signal is also used for frequency conversion in said transmit portion of said transceiver, and wherein said first signal has either an intermediate frequency or radio frequency.

10. The transceiver of claim 9, wherein the transmit portion further comprises at least a first mixer and a second mixer; wherein a first mixer is configured to receive said third signal and an IF transmit signal and wherein a second mixer is configured to receive the first scaled signal and a filtered output of said first mixer.

11. A transceiver having a transmit portion and a receive portion, said transceiver comprising:
   a power splitter configured to receive an oscillator signal and to divide said oscillator signal into first and second signals; and
   a first multiplier configured to receive said first signal and to scale the frequency of said first signal by a factor of M to create a first scaled signal, wherein the frequencies of said first scaled signal and said second signal are not equal to each other,
   wherein said first scaled signal is used for frequency conversion in the transmit portion of said transceiver, wherein said second signal is used for frequency conversion in the receive portion of said transceiver, wherein M is any rational integer number other than 0 and 1, wherein the frequency of said oscillator signal is allowed to drift, and wherein, with the exception of the drift in the frequency of said oscillator signal, the frequency of said oscillator signal is the same frequency for both transmit and receive operations.

12. The transceiver of claim 11, further comprising an oscillator configured to generate said oscillator signal, wherein said oscillator is a free running local oscillator, wherein said free running local oscillator is allowed to drift, wherein said oscillator is not phase locked to a reference oscillator, and wherein said first signal has either an intermediate frequency or radio frequency.

13. The transceiver of claim 11, wherein said transmit portion further comprises a dual super-heterodyne configuration.

14. The transceiver of claim 11, wherein said transceiver further comprises a duplexer configured to provide full duplex communication.

15. The transceiver of claim 11, wherein a transmit IF signal is frequency corrected to compensate for drift in said oscillator signal, and wherein said frequency correction occurs before said frequency conversion in the transmit portion.

16. The transceiver of claim 11, further comprising a frequency correction device configured to: identify frequency drift in an IF receive signal in a receive portion; and pre-correct an IF transmit signal such that an RF transmit signal output of the transceiver is frequency corrected to account for drift in said oscillator signal.

17. The transceiver of claim 11, wherein the power splitter is further configured to create a third signal substantially equal to said first signal; wherein said third signal is used for frequency conversion in said transmit portion of said transceiver, and wherein said first signal has either an intermediate frequency or radio frequency.

18. The transceiver of claim 17, wherein the transmit portion further comprises at least a first mixer and a second mixer; wherein said first mixer is configured to receive said third signal and an IF transmit signal and wherein said second mixer is configured to receive said first scaled signal and a filtered output of said first mixer.

19. A signal transceiving method comprising:
splitting an oscillator signal into a first signal and a second signal;
scaling the frequency of said first signal to obtain a desired multiple of said first signal;
scaling the frequency of said second signal to obtain a desired multiple of said second signal, wherein an M/N relationship exists between the scaled frequencies of said first signal and said second signal, wherein M and N are each rational integer numbers, wherein M does not equal zero, wherein N does not equal zero, and wherein the ratio of M/N is any ratio other than +1; and
mixing a radio frequency ("RF") receive signal, received at a receive portion of said transceiver, with the scaled version of said first signal to facilitate frequency conversion in said receive portion of said transceiver;
mixing an intermediate frequency ("IF") transmit signal, received at a transmit portion of said transceiver, with the scaled version of said second signal to facilitate frequency conversion in said transmit portion of said transceiver;
wherein a frequency of said RF receive signal is different than a frequency of an RF transmit signal that is output from said transmit portion.

20. The signal transceiving method of claim 19, wherein:
(A) the transmit frequency conversion is the result of one of: (i) the sum of an intermediate frequency ("IF") transmit signal frequency and the frequency of the scaled version of said second signal, and (ii) the difference of said IF transmit signal frequency and the frequency of the scaled version of said second signal; and
(B) the receive frequency conversion is the result of one of: (i) the sum of said RF receive signal frequency and the frequency of the scaled version of said first signal, and (ii) the difference of said RF receive signal frequency and the frequency of the scaled version of said first signal.

21. The signal transceiving method of claim 19, wherein said transmit portion further comprises a dual super-heterodyne configuration.

22. The signal transceiving method of claim 19, wherein a transmit IF signal is frequency corrected to compensate for drift in said oscillator signal, and wherein said frequency correction occurs before said frequency conversion in the transmit portion.

23. The signal transceiving method of claim 19, further comprising a frequency correction device configured to: identify frequency drift in an IF receive signal in a receive portion; and pre-correct an IF transmit signal such that an RF transmit signal output of the transceiver is frequency corrected to account for drift in said oscillator signal.

24. The signal transceiving method of claim 19, further comprising splitting an oscillator signal into a first signal, a second and a third signal wherein the third signal is substantially equal to said first signal; wherein said first and third signals are used for frequency conversion in said transmit portion of said transceiver.

25. The signal transceiving method of claim 24, further comprising:
mixing a third signal and a IF transmit signal in a first mixer; and
mixing a filtered output of the first mixer and said scaled first signal in a second mixer.

\* \* \* \* \*